US010999433B2

(12) United States Patent
Aly et al.

(10) Patent No.: US 10,999,433 B2
(45) Date of Patent: May 4, 2021

(54) INTERPRETATION OF USER INTERACTION USING MODEL PLATFORM

(71) Applicant: Verizon Patent and Licensing Inc., Arlington, VA (US)

(72) Inventors: Safwan Aly, Plano, TX (US); Srinivasan Krishnamurthy, Irving, TX (US); Pritam Bedse, Coppell, TX (US); Vipul Jha, Plano, TX (US); Rajat Sharma, Southlake, TX (US); Senthil Muthusamy, Lewisville, TX (US); Travis R. McLaren, Southlake, TX (US); Richard J. Worthington, Chantilly, VA (US); Sailesh K. Mishra, Frisco, TX (US); Philip A. Jenkins, Fredericksburg, VA (US); Venkateswararao Godavarti Veera, Mckinney, TX (US); John Benjamin Lertola, Annandale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 176 days.

(21) Appl. No.: 16/206,643

(22) Filed: Nov. 30, 2018

(65) Prior Publication Data
US 2020/0177731 A1 Jun. 4, 2020

(51) Int. Cl.
*H04M 3/52* (2006.01)
*H04M 3/51* (2006.01)
*G06N 3/08* (2006.01)
*G06N 20/00* (2019.01)
*H04M 3/523* (2006.01)

(52) U.S. Cl.
CPC ............ *H04M 3/5166* (2013.01); *G06N 3/08* (2013.01); *G06N 20/00* (2019.01); *H04M 3/5235* (2013.01)

(58) Field of Classification Search
CPC ... H04M 3/5166; H04M 3/5235; G06N 20/00
USPC .................................................. 379/265.02
See application file for complete search history.

(56) References Cited

U.S. PATENT DOCUMENTS

| 10,542,148 B1 * | 1/2020 | Merritt ..................... G06N 7/08 |
| 2015/0278823 A1 * | 10/2015 | Kushnir ............... G06Q 30/016 |
| | | 705/304 |
| 2019/0238487 A1 * | 8/2019 | Ciano ..................... G06F 40/30 |

* cited by examiner

*Primary Examiner* — Ahmad F. Matar
*Assistant Examiner* — Jirapon Intavong

(57) ABSTRACT

A platform can receive information regarding a user interaction, wherein the user interaction is associated with one or more channels that correspond to respective interfaces or media for the user interaction; retrieve supplemental information associated with the user interaction, wherein the supplemental information relates to at least one of: a state of a managed device associated with the user interaction, or a previous user interaction; identify, based on the information regarding the user interaction or the one or more channels, one or more models to process the information regarding the user interaction and the supplemental information, wherein the one or more models are identified from a plurality of models; determine, using the one or more models, an action to be performed with regard to the user interaction; and provide information identifying the action.

20 Claims, 5 Drawing Sheets

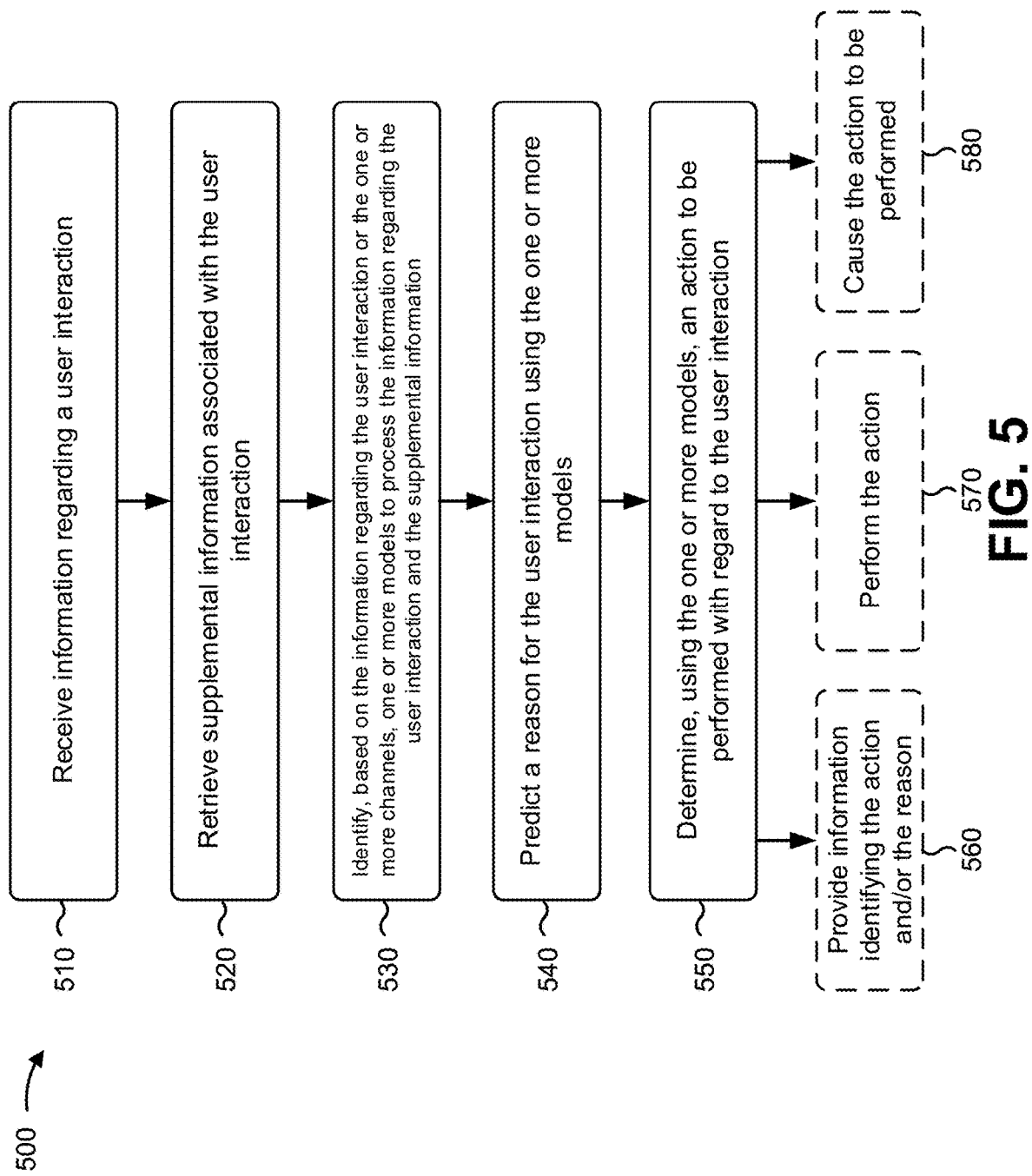

INTERPRETATION OF USER INTERACTION USING MODEL PLATFORM

BACKGROUND

An organization can interact with customers to identify issues, offer upgrades or specials, troubleshoot problems, and/or the like. Customer interaction can occur using a variety of channels. A customer can be associated with various managed devices that can be controllable by a device associated with the organization.

BRIEF DESCRIPTION OF THE DRAWINGS

FIG. 5 is a flow chart of an example process for determining an action or a prediction based on information regarding a user interaction and supplemental information associated with the user interaction.

DETAILED DESCRIPTION OF PREFERRED EMBODIMENTS

Figure 1:
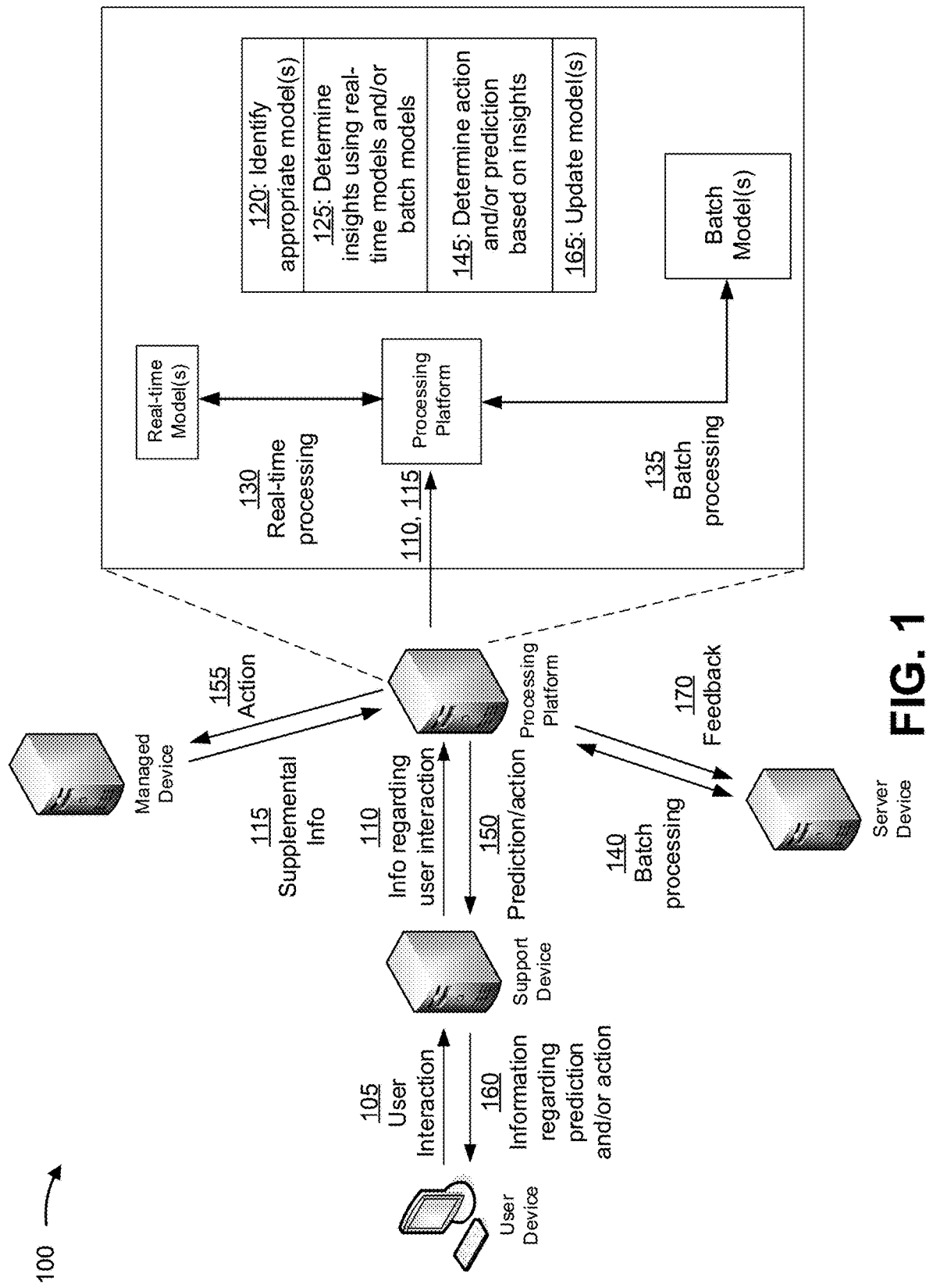
FIG. 1 is a diagram of an example implementation described herein.

The following detailed description of example implementations refers to the accompanying drawings. The same reference numbers in different drawings can identify the same or similar elements.

An organization (e.g., an employee of an organization) can interact with customers to identify issues, offer upgrades or specials, troubleshoot problems, provide technical support, and/or the like. Customer interaction can occur using a variety of channels (e.g., a web interface, an app, a voice call, a television menu, an email, a text message, mail, a customer service representative, etc.). It can be useful to determine various predictions or actions to perform with regard to a user interaction with a customer. Examples of predictions or actions include a predicted reason for a call (e.g., a particular device for which the customer needs technical support, an Internet outage, renewing a service, etc.), an upsell action, an automatic billing action (e.g., removing a billing item, reducing a billing item, etc.), a predicted domain of a call (e.g., technical support, billing, customer retention, etc.), and/or the like. Some techniques for identifying predictions or actions can use a static rule to determine a prediction or an action. One example of such a rule can be implemented using a voice recognition system that can determine a predicted domain of a call based on a customer's statement of the domain (e.g., "technical support," "Internet," and so on), or a system that determines a predicted domain of a call based on a touchtone phone interaction (e.g., as in "Dial 1 for Internet help").

The usage of static rules to determine predictions and/or actions can be unreliable and inflexible. For example, in the case when a customer states "Internet" as a reason for a call, it can be unclear whether the call relates to an Internet outage or a billing issue for the customer's Internet account. As another example, it can be difficult or impossible to anticipate variations in interactions with a customer that can be used to determine the prediction or action (e.g., a static rule can have difficulty in parsing sentences in different orders, differences in regional dialect, and/or the like). Furthermore, the usage of different channels can lead to increased variation in the interactions, which can require increasingly complex rules to process effectively. When the prediction or action is incorrect, the customer can become frustrated, can end the call, or can call multiple times in an attempt to remedy the situation, thereby wasting processor and network resources by needlessly prolonging the call or ending the call or performing multiple calls rather than determining an acceptable prediction or action. Even further, a static rules-based approach might not be robust enough to handle information from multiple, different sources, or can be prohibitively complex and resource-intensive if the static rules-based approach is used to handle such information.

Some implementations described herein determine predictions or actions for a user interaction (e.g., a customer interaction or another type of user interaction) based on a plurality of models and based on supplemental information associated with a user of the user interaction. Some implementations described herein can select one or more models for determination of the predictions or actions (e.g., based on context of the user interaction, supplemental information associated with the user interaction, and/or the like), which can conserve processing resources that would otherwise be used to process the user interaction using an irrelevant model or all models available. The models can provide determinations regarding the user interaction, and this information can be used to determine predictions or actions regarding the user interaction. The determination regarding the user interaction that is outputted by the one or more models can be referred to herein as an insight.

Some implementations described herein can provide the training and/or updating of models based on a machine learning technique, an artificial intelligence technique, and/or the like. For example, some implementations described herein can update a model used to determine an insight based on feedback regarding accuracy and/or usefulness of the insight. Some implementations described herein can provide ranking or prioritization of insights (e.g., based on rules for prioritizing or arbitrating between conflicting or different insights, based on business rules for handling insights, etc.). Some implementations described herein can perform an action and/or provide information identifying a prediction identified using the insights, as described in more detail elsewhere herein.

In this way, accuracy of predictions and/or actions, determined for a user interaction, can be improved relative to using static rules-based approaches for determining predictions and/or actions. Furthermore, by using one or more models (e.g., generated using machine learning, artificial intelligence, and/or the like) to determine the predictions and/or actions, robustness of the determination of the predictions and/or actions and variety of input information used to determine the predictions and/or actions can be improved. Still further, by identifying which models are to be used to determine insights for a user interaction, processor and other resources can be conserved that would otherwise be used to process the user interaction using an irrelevant model. Even further, implementations described herein can improve the prediction/action process and, thus, conserves resources that would be wasted with incorrect predictions and/or actions.

FIG. 1 is a diagram of an example implementation 100 described herein. As shown in FIG. 1, and by reference number 105, a user device can perform a user interaction with a support device. In some implementations, the user interaction can be performed via a particular channel (e.g., a web interface, an app, a voice call, a television menu, an email, a text message, mail, etc.) between the user device and the support device. In some implementations, the user interaction can be performed for a particular reason and/or in a particular domain. As non-limiting examples, the user interaction can be associated with technical support, a billing issue, an account origination, an account closure, a customer service interaction, and/or the like. In some implementations, the user interaction can be performed without a user device and/or a support device. As examples, the user interaction can be performed at a technical support counter, or the user device can submit a ticket to a system maintained by or associated with the processing platform.

As shown by reference number 110, a processing platform can receive information regarding the user interaction from the support device. In some implementations, the information regarding the user interaction can identify the user interaction. For example, the information regarding the user interaction can include textual content from the user interaction, a transcription based on the user interaction, and/or the like. In some implementations, the information regarding the user interaction can include information determined by the support device regarding the user interaction (e.g., metadata associated with the user interaction, a state of the user device, responses to questions or automated prompts provided by the support device, etc.).

In some implementations, the processing platform can receive information regarding multiple user interactions associated with a user of the user device. For example, the processing platform can receive the information regarding the multiple user interactions from the support device, from a server device (e.g., a server device that stores information regarding past user interactions), from the user device, and/or the like. In some implementations, the support device can automatically provide information regarding past user interactions, which conserves resources of the processing platform that would otherwise be used to request such information. In some implementations, the processing platform can request the information regarding the past user interactions, which conserves resources of the processing platform that might otherwise be used to process or store irrelevant information. In some implementations, the information regarding the past user interactions can be included in or considered part of the supplemental information described elsewhere herein.

As shown by reference number 115, the processing platform can receive supplemental information. In some implementations, the processing platform can retrieve the supplemental information. For example, the processing platform can retrieve supplemental information associated with the user interaction (e.g., within a particular time range of the user interaction, associated with a user of the user interaction, etc.), which conserves resources of the processing platform that would otherwise be used to process and/or store irrelevant supplemental information.

Here, the processing platform receives the supplemental information from a managed device, although supplemental information can be received from other sources that are described in more detail elsewhere herein. The managed device can include a device that can be remotely managed, configured, or operated by the processing platform, such as a set top box, a home router, an optical network terminal, a base station, a backend network device, and/or the like. The supplemental information can include information associated with a condition or state of the managed device, information associated with operation of the managed device, information associated with a service area of the managed device, and/or the like.

In some implementations, the supplemental information can relate to a state of the managed device. For example, the supplemental information can include information indicating an operational state of the managed device, a service alarm associated with the managed device (e.g., indicating that a service of the managed device has failed or is undergoing an outage), an error log associated with the managed device, an operational log associated with the managed device, an event associated with the managed device, and/or the like.

In some implementations, the supplemental information can include information regarding a user associated with a user interaction. For example, the supplemental information can include information identifying equipment (e.g., managed devices, user devices, or other types of devices) associated with the user, an order history of the user (e.g., order events, drop shipping events, shopping bundle information associated with the user), billing information (e.g., billing events, payment information, autopay information), repair information associated with the user (e.g., repair transactions, dispatch events, etc.), user account information, information regarding past user interactions with the user, the user's search history or self-help history, and/or the like.

In some implementations, the processing platform can receive supplemental information from multiple, different sources. For example, the processing platform can receive information regarding different managed devices from the managed devices, from server devices or storage devices associated with the managed devices, and/or the like. As another example, the processing platform can receive supplemental information regarding a set of managed devices from the set of managed devices, and can receive supplemental information regarding a billing history of a user from a billing device. The processing platform can perform preprocessing on the supplemental information from the different sources so that the supplemental information is in a format usable by the processing platform, thereby conserving resources of the various devices that would otherwise be used to process the information locally and improving flexibility of the processing platform by increasing the number of data types usable to the processing platform.

In some implementations, the processing platform can perform a preprocessing operation on the data. Preprocessing can include, for example, standardizing channel names, standardizing alarm names, combining data from different domains, flattening data, filtering noise, filtering duplicates, determining combined data values (e.g., total alarm count, last channel used, etc.), categorizing supplemental information, imputing missing values, dropping or smoothing outliers, encoding (e.g., one hot encoding, label encoding, etc.), and/or the like. The processing platform can ensure or provide consistency, reusability, and reproducibility between the training and serving pipelines to reduce training serving skew. Thus, the processing platform can improve performance of the models and conserve processing resources of the processing platform that would otherwise be used to process data that is not preprocessed to a desired format. In this way, the processing platform can organize thousands, millions, billions, or more data entries for machine learning and model generation—a data set that cannot be processed objectively by a human actor.

As shown by reference number 120, the processing platform can identify one or more appropriate models (e.g., machine learning models) for processing the information regarding the user interaction and the supplemental information. For example, the processing platform can process information regarding a user interaction and/or supplemental information using a plurality of different models. In some implementations, the processing platform can identify one or more models for processing the information regarding the user interaction and the supplemental information. For example, the one or more models can include fewer than all models of the plurality of models, which can conserve processing resources of the processing platform that would otherwise be used to process data using all models of the plurality of models.

In some implementations, the processing platform can identify the one or more models based on a request from the support device. For example, the support device can provide a request to the processing platform to cause the processing platform to identify an action and/or a prediction for a user interaction associated with the support device. This can conserve processing resources of the processing platform that would otherwise be used to detect ongoing user interactions. In such a case, in some implementations, the request can identify a particular model to use, a particular action to be identified, a particular prediction to be made, and/or the like. In some implementations, the request might not identify a particular model, action, or prediction. In some implementations, the processing platform can automatically identify the one or more models. For example, the processing platform can detect that a user interaction is occurring, and can automatically (e.g., without receiving a request) identify an action and/or a prediction for the user interaction. This can conserve communication resources of the support device that would otherwise be used to communicate a request to the processing platform.

In some implementations, the one or more models can include one or more batch models (e.g., models stored by and/or pre-scored by the processing platform or a device external to the processing platform, such as a server device, an on-premises device, and/or the like) and/or one or more real-time models (e.g., models executed in real time). Using a batch model can reduce latency associated with determining an insight in comparison to an real-time model, whereas using a real-time model can ensure relevant and most up to date insights are computed.

In some implementations, the processing platform can train a model to determine an insight. In some implementations, the model can be trained by another device (e.g., a server device, an on-premises device, and/or the like), and the processing platform can receive the model from the other device. For example, the processing platform can train the model based on one or more parameters associated with a user interaction, such as information regarding the user interaction, supplemental information associated with the user interaction, one or more insights regarding the user interaction, and/or the like. The processing platform can train the machine learning model using historical data associated with the user interaction according to the one or more parameters. Using the historical data and the one or more parameters as inputs to the machine learning model, the processing platform can determine insights regarding the user interaction to facilitate the determination of predictions and/or actions associated with the user interaction. More detail regarding the training and updating of models is provided elsewhere herein.

A model can include any model that is configured to determine an insight regarding a user interaction based on information regarding the user interaction and/or based on supplemental information associated with the user interaction. The insights determined by the models can relate to various domains, such as technical support, billing, Internet performance, upselling, intent prediction (e.g., predicting an intent associated with a call), and/or the like. More particular examples of the domains can include a reactive technical support intent prediction domain (e.g., predicting when a user's call relates to technical support or predicting a particular type of technical support that the user is likely to need), a bill increase call prediction domain (e.g., predicting when a call relates to an increase in a user's bill), a proactive technical support intent prediction domain (e.g., predicting when technical support requests are likely to be received based on supplemental information associated with one or more managed devices), a premium channel upsell domain (e.g., determining when an upselling offer should be provided to a user), a churn propensity domain (e.g., predicting customer attrition based on a user interaction), Internet performance (e.g., determining actions or recommendations to improve performance of a customer's home Internet connection or wireless local area network), and/or the like.

In some implementations, the processing platform can train a model. For example, the processing platform can portion information regarding user interactions and/or supplemental information associated with the user interactions into a training set, a validation set, a test set, and/or the like. In some implementations, the processing platform can preprocess and/or perform dimensionality reduction to reduce the information regarding a user interaction and/or supplemental information associated with the user interaction to a minimum feature set. In some implementations, the processing platform can train the model on this minimum feature set, thereby reducing processing required to train the machine learning model, and can apply a classification technique to the minimum feature set.

In some implementations, the processing platform can use a support vector machine (SVM) classifier technique to generate a non-linear boundary between data points in the training set. In this case, the non-linear boundary is used to classify test data (e.g., information regarding a user interaction and/or supplemental information associated with the user interaction) into a particular class (e.g., a class corresponding to a particular insight, and/or the like).

Additionally, or alternatively, the processing platform can train the model using a supervised training procedure that includes receiving input to the model from a subject matter expert, which can reduce an amount of time, an amount of processing resources, and/or the like to train the model relative to an unsupervised training procedure. In some implementations, the processing platform can use one or more other model training techniques, such as a neural network technique, a latent semantic indexing technique, and/or the like. For example, the processing platform can perform an artificial neural network processing technique (e.g., using a two-layer feedforward neural network architecture, a three-layer feedforward neural network architecture, and/or the like) to perform pattern recognition, based on information regarding a user interaction and/or supplemental information associated with the user interaction, to determine insights regarding such information. In this case, using the artificial neural network processing technique can improve an accuracy of a model generated by the processing platform by being more robust to noisy, imprecise, or incomplete data, and by enabling the processing platform to detect patterns and/or trends undetectable to human analysts or systems using less complex techniques.

Accordingly, the processing platform can use any number of artificial intelligence techniques, machine learning techniques, deep learning techniques, and/or the like to determine predictions and/or actions for a user interaction.

In some implementations, the processing platform can select an appropriate model based on a context of the user interaction. For example, the processing platform can select an appropriate model, or can determine that a model is not to be used, based on a channel associated with a user interaction, based on the information regarding the user interaction, and/or the like. As one example, the processing platform can determine that a user interaction is associated with a chat bot on a billing support page, and can identify one or more models associated with billing support based on the user interaction being associated with the chat bot on the billing support page. As a second example, the processing platform can determine that an upselling model is not to be used when a user interaction is related to a billing complaint.

In some implementations, the processing platform can select an appropriate model based on an insight regarding a user interaction. For example, the processing platform can determine the insight using another model, or can determine the insight as part of a data intake process, as described in more detail elsewhere herein. As an example of identifying an appropriate model based on an insight regarding a user interaction, the processing platform can determine that a user interaction should be processed using a reactive technical support intent prediction model based on an insight that there is an Internet outage in the user's area. As a second example, the processing platform can determine that a user interaction should not be processed using an upselling model based on an insight that the user interaction is associated with a poor service quality. Thus, the processing platform can identify an appropriate model based on an insight regarding a user interaction, thereby improving the accuracy of model selection and conserving processing resources that would otherwise be used in connection with poorly-selected models.

As shown by reference number 125, the processing platform can determine insights regarding the user interaction using the one or more models. For example, the processing platform can input, to a selected model, the information regarding the user interaction and/or the supplemental information. The selected model can output information identifying an insight. As shown by reference number 130, in some implementations, the processing platform can perform real-time processing for the one or more real-time models. For example, the processing platform can input information regarding user interactions to the one or more real-time models as the information regarding the user interactions is received or determined. This reduces latency associated with the identification of insights, thereby conserving processing resources of the processing platform and reducing impact on user experience. In some implementations, real-time model processing can be performed by a device external to the processing platform, such as an on-premises device, a server, device, and/or the like.

As shown by reference number 135, in some implementations, the processing platform can perform batch processing for the one or more batch models. In some implementations, and as shown by reference number 140, a server device can perform the batch processing. In some implementations, the server device can be part of the processing platform. In some implementations, the server device can be external to the processing platform. For example, the server device can be an on-premises device associated with the user. This can conserve processing resources of the processing platform that would otherwise be used to perform the batch processing, and can satisfy certain data privacy or confidentiality laws. In the case when the server device performs the batch processing, the server device can provide information identifying insights or scores outputted by the one or more batch models to the processing platform, which the processing platform can use to determine insights, actions, and/or predictions. Thus, processing resources of the processing platform can be conserved relative to performing the processing at the processing platform. In some implementations, the processing platform can provide only a dataset relevant to the one or more batch models, thereby conserving resources that would otherwise be used to provide unnecessary data. In some implementations, the server device can store the dataset relevant to the one or more batch models.

As shown by reference number 145, the processing platform can determine an action and/or prediction for the user interaction based on the insights. For example, the processing platform can identify an action to be performed by the support device, an action to be performed by a customer support representative associated with the user interaction, an action to be performed by a managed device associated with the user interaction, and/or the like. As other examples, the processing platform can predict a reason for a call (e.g., a technical support call, a billing call, etc.), can predict that a call is likely to be received, and/or the like.

In some implementations, an action and/or prediction can be determined based on an insight. For example, when an insight indicates that a call is associated with a threshold score relative to an upselling metric, the processing platform can identify an action to offer an upsell to the user. As another example, when an insight indicates that a user's managed device is associated with an outage, the processing platform can identify an action to reset or reconfigure the managed device. As a third example, when an insight indicates that a user is associated with a recent bill increase, the processing platform can predict a reason for the user interaction as relating to the recent bill increase.

In some implementations, the processing platform can determine an action and/or prediction based on multiple different insights. For example, the processing platform can determine a plurality of insights using a plurality of models. In some cases, some insights can conflict with other insights. In some cases, one insight can be associated with a lower confidence score than another insight. In some cases, one insight can be more valuable or more desirable than another insight (e.g., an insight that can be used to improve network performance for many users can be more desirable than an insight that can be used to improve network performance for a single user, or an insight that can be used to increase revenue can be more desirable than an insight that might decrease revenue). In some implementations, the processing platform can prioritize a plurality of insights, and can determine an action or prediction based on a highest-priority N insights of the plurality of insights, where N is greater than or equal to 1. Additionally, or alternatively, the processing platform can determine actions or predictions based on the plurality of insights, and can prioritize the actions or predictions to identify a highest-priority N actions or predictions. By prioritizing actions, predictions, and/or insights, accuracy and efficacy of the actions, predictions, and/or insights can be improved, and processing resources of the processing platform that would otherwise be used to perform lower-priority actions in addition to higher-priority actions can be conserved.

In some implementations, the processing platform can prioritize an insight, an action, or a prediction based on one or more factors. For example, the processing platform can use an algorithm that receives, as input, various parameters associated with an insight, an action, or a prediction, and that outputs information identifying a priority level of the insight, the action, or the prediction. In some implementations, the various parameters can be based on a model used to determine the insight. For example, a parameter can identify a confidence level, a fit value, a regression value, a machine learning parameter, and/or the like, that indicates how well the insight fits the user interaction. In some implementations, the various parameters can be based on a technical value or a business value. For example, a parameter can identify a processing load; a number of users impacted by an action; organizational resource usage associated with an insight, action, or prediction; an expected improvement associated with an insight, action, or prediction; and/or the like. In this way, the processing platform can determine which actions and/or predictions are to be performed or used for a user interaction based on parameters associated with the actions and/or predictions, thereby conserving processing resources that would otherwise be used for low-priority or contradictory actions and/or predictions.

As shown by reference number 150, in some implementations, the processing platform can provide, to the support device, information identifying the action and/or the prediction. In some implementations, the processing platform can provide information identifying the action so that the support device (e.g., a chat bot provided by the support device, a user associated with the support device, etc.) can perform the action. For example, the support device can upsell the user, can provide an indication that the user device (or a user associated with the user device) is to perform the action, and/or the like. The processing platform can provide information identifying the prediction so that the support device can use the prediction to more effectively handle the user interaction and/or to perform an action based on the prediction. For example, if the prediction relates to a reason for the call, the support device can request that a user associated with the user interaction provide an indication of whether the prediction is accurate, can provide a self-help option for the user based on the prediction, can escalate the user interaction to a subject matter expert associated with the reason for the call, and/or the like. In this way, the processing platform enables more accurate and responsive customer support, thereby conserving processing resources that would otherwise be consumed in connection with non-responsive or poorly targeted customer support actions or predictions.

As shown by reference number 155, in some implementations, the processing platform can cause a managed device to perform an action. For example, the processing platform can reset or reconfigure the managed device (e.g., can power cycle the managed device, can change a transmit power of the managed device, can reconfigure an operating band of the managed device, can change a radio access technology of the managed device, etc.). In some implementations, the processing platform can cause a managed device to provide information for display. For example, the processing platform can cause a set-top box to provide information regarding an outage in an area associated with the set-top box based on an insight regarding the outage. In this way, the processing platform can automatically and remotely cause a managed device to perform an action based on a user interaction with a customer associated with the managed device, thereby improving performance of the managed device and conserving network resources that might otherwise be used to instruct a user to cause the managed device to perform the action.

As shown by reference number 160, in some implementations, the support device can provide information regarding the action and/or the prediction to a user device. For example, the support device can request that a user associated with the user interaction provide an indication of whether the prediction is accurate, can provide a self-help option for the user based on the prediction, can provide an indication that the user is to perform the action, can cause the user device to perform the action, and/or the like. Thus, the support device can conserve processing resources that would otherwise be used to perform the action locally. Furthermore, the accuracy and responsiveness of support provided by the support device can be improved, thereby conserving network and processing resources that might otherwise be used to provide poorly-targeted or inefficient support.

As shown by reference number 165, in some implementations, the processing platform can update the one or more models. Additionally, or alternatively, as shown by reference number 170, the processing platform can provide feedback regarding the one or more batch models to the server device for the server device to update the one or more models. For example, the processing platform can receive feedback regarding an insight determined by a model, or regarding an action or prediction determined based on a model. In some implementations, the processing platform can receive the feedback from a user device, a support device, a managed device, a subject matter expert, and/or the like. In some implementations, the feedback can identify a performance indicator for the model, such as a call volume, a churn value, a revenue value, and/or the like. The processing platform or the server device can train the model based on the feedback. For example, the processing platform or the server device can use a machine learning technique, an artificial learning technique, and/or the like to train the model. In this way, the processing platform can improve accuracy of the model over time, thereby conserving processing resources and/or organizational resources that would otherwise be used in connection with inaccurate or suboptimal insights, actions, and/or predictions.

In this way, several different stages of a process for identifying actions and/or predictions for a user interaction based on insights regarding the user interaction are automated, which can remove human subjectivity and waste from the process, and which can improve speed and efficiency of the process and conserve computing resources (e.g., processor resources, memory resources, and/or the like). Furthermore, some implementations described herein use a rigorous, computerized process to perform tasks or activities that were not previously performed. For example, previously, there did not exist a technique to identify actions and/or predictions using information regarding a user interaction and supplemental information regarding managed devices associated with the user interaction. Accordingly, computing resources associated with manually identifying a reason or action, or identifying a reason or action based on a static rules-based approach, as described herein, are conserved. Furthermore, automating the process for identifying actions and/or predictions for a user interaction, as described herein, conserves computing resources (e.g., processor resources, memory resources, and/or the like) that would otherwise be wasted by manually identifying a reason or action or identifying a reason or action based on a static rules-based approach.

As indicated above, FIG. 1 is provided merely as an example. Other examples can differ from what was described with regard to FIG. 1.

Figure 2:
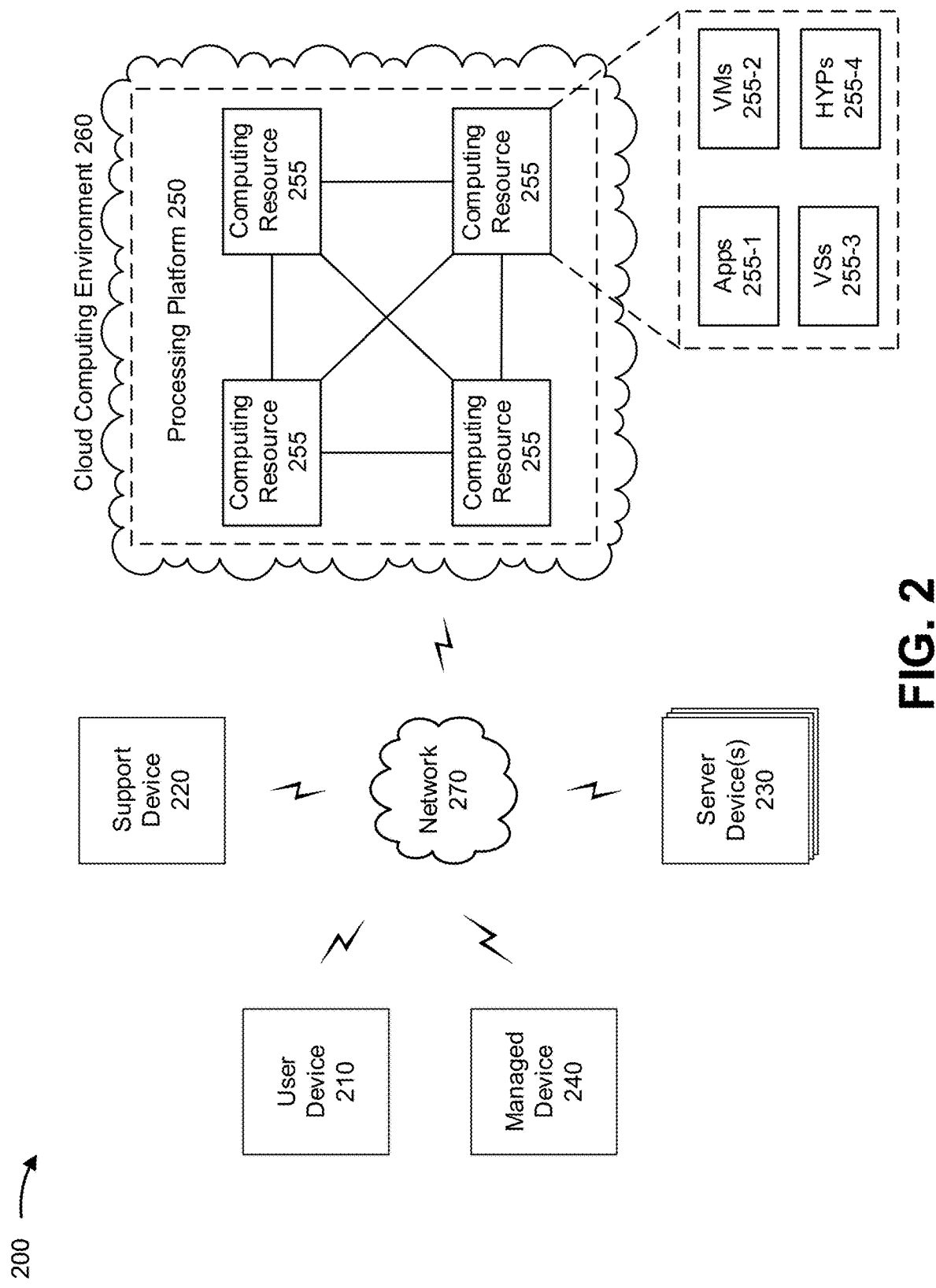
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a user device 210, a support device 220, a server device 230, a managed device 240, a processing platform 250, a computing resource 255, a cloud computing environment 260, and a network 270. Devices of environment 200 can interconnect via wired connections, wireless connections, or a combination of wired and wireless connections.

User device 210 includes one or more devices capable of receiving, generating, storing, processing, and/or providing information associated with a user interaction. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Support device 220 includes one or more devices capable of receiving, generating, storing, processing, and/or providing information associated with a channel for user interaction. For example, support device 220 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, support device 220 can include a server device. In some implementations, support device 220 can provide a channel for a user interaction, such as a chat bot, an email system, a website, and/or the like. In some implementations, support device 220 can store information associated with a user interaction, such as a log of the user interaction, metadata regarding the user interaction, and/or the like.

Server device 230 includes one or more devices capable of storing, processing, and/or routing information. In some implementations, server device 230 can include a communication interface that allows server device 230 to receive information from and/or transmit information to other devices in environment 200.

Managed device 240 includes a device that can be controlled by processing platform 250. For example, managed device 240 can include a router, a switch, a firewall, a set top box, a backend network device, a base station, a user equipment (UE), and/or the like. In some implementations, managed device 240 can provide supplemental information regarding a state of managed device 240 (e.g., to processing platform 250 and/or another device).

Processing platform 250 includes one or more computing resources assigned to determination of insights, actions, and/or predictions in association with user interactions. For example, processing platform 250 can be a platform implemented by cloud computing environment 260 that can select models for processing of a user interaction, determine insights using the models, and/or determine actions and/or predictions for the user interaction based on the insights. In some implementations, processing platform 250 is implemented by computing resources 255 of cloud computing environment 260.

Processing platform 250 can include a server device or a group of server devices. In some implementations, processing platform 250 can be hosted in cloud computing environment 260. Notably, while implementations described herein describe processing platform 250 as being hosted in cloud computing environment 260, in some implementations, processing platform 250 can be non-cloud-based or can be partially cloud-based.

Cloud computing environment 260 includes an environment that delivers computing as a service, whereby shared resources, services, etc. can be provided to processing platform 250. Cloud computing environment 260 can provide computation, software, data access, storage, and/or other services that do not require end-user knowledge of a physical location and configuration of a system and/or a device that delivers the services. As shown, cloud computing environment 260 can include processing platform 250 and computing resource 255.

Computing resource 255 includes one or more personal computers, workstation computers, server devices, or another type of computation and/or communication device. In some implementations, computing resource 255 can host processing platform 250. The cloud resources can include compute instances executing in computing resource 255, storage devices provided in computing resource 255, data transfer devices provided by computing resource 255, etc. In some implementations, computing resource 255 can communicate with other computing resources 255 via wired connections, wireless connections, or a combination of wired and wireless connections.

As further shown in FIG. 2, computing resource 255 can include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that can be provided to or accessed by user device 210. Application 255-1 can eliminate a need to install and execute the software applications on user device 210. For example, application 255-1 can include software associated with processing platform 250 and/or any other software capable of being provided via cloud computing environment 260. In some implementations, one application 255-1 can send/receive information to/from one or more other applications 255-1, via virtual machine 255-2.

Virtual machine 255-2 includes a software implementation of a machine (e.g., a computer) that executes programs like a physical machine. Virtual machine 255-2 can be either a system virtual machine or a process virtual machine, depending upon use and degree of correspondence to any real machine by virtual machine 255-2. A system virtual machine can provide a complete system platform that supports execution of a complete operating system ("OS"). A process virtual machine can execute a single program, and can support a single process. In some implementations, virtual machine 255-2 can execute on behalf of a user (e.g., user device 210), and can manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 can present a virtual operating platform to the guest operating systems, and can manage the execution of the guest operating systems. Multiple instances of a variety of operating systems can share virtualized hardware resources.

Network 270 includes one or more wired and/or wireless networks. For example, network 270 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, one or more devices shown in FIG. 2 can be associated with a premises. For example, one or more devices shown in FIG. 2 can be on-premises devices. Additionally, or alternatively, at least part of the processing platform can be provided on-premises. For example, the processing platform can be implemented entirely in the cloud, can be a hybrid cloud deployment, and/or can be at least partially deployed on-premises. Furthermore, at least some of the operations described herein as being performed by the processing platform may be performed by an on-premises device (e.g., which may be part of the processing platform or may be separate from or external to the processing platform).

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
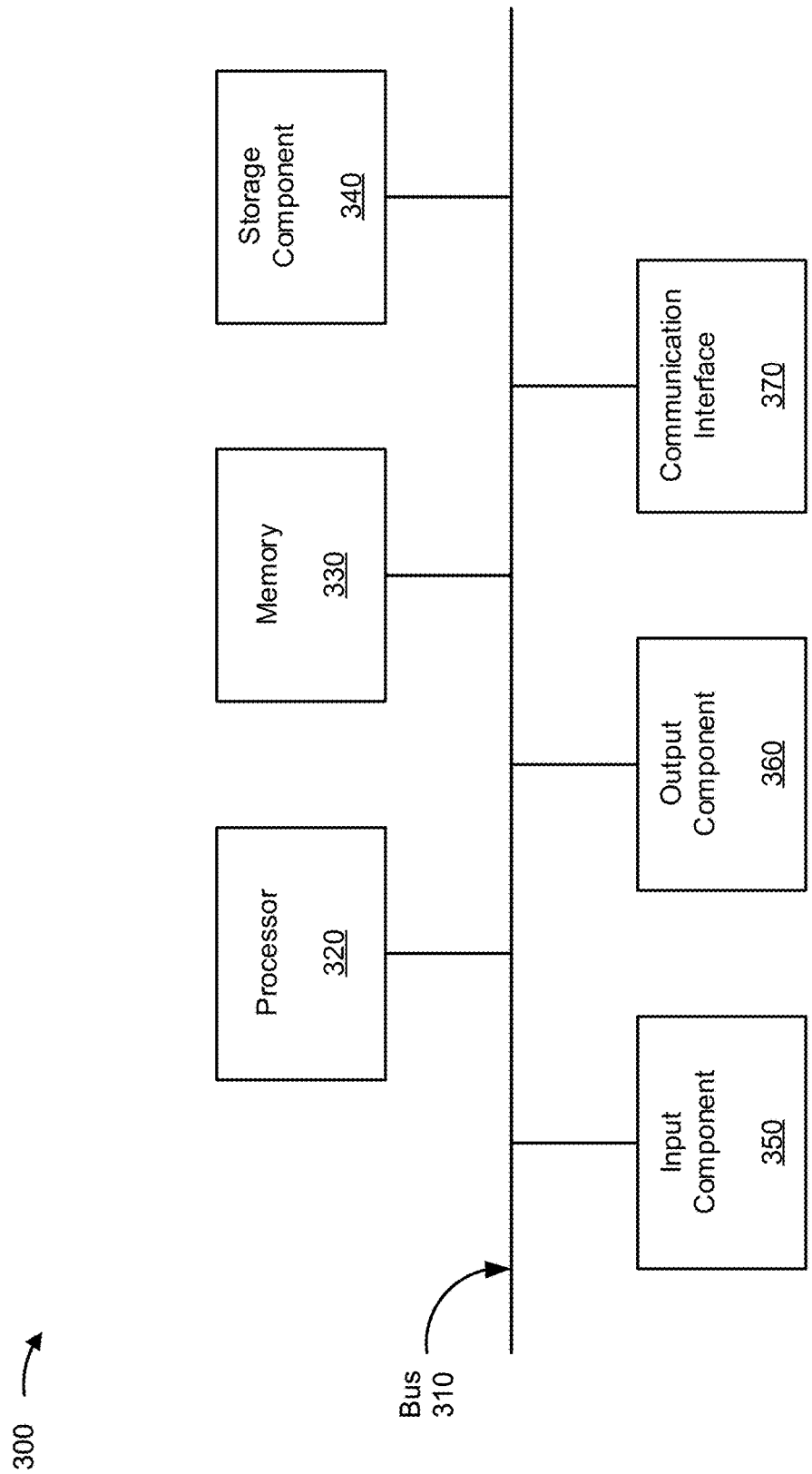
FIG. 3 is a diagram of example components of one or more devices of FIG. 2.

FIG. 3 is a diagram of example components of a device 300. Device 300 can correspond to user device 210, support device 220, a server device 230, processing platform 250, and/or computing resource 255. In some implementations user device 210, support device 220, server device 230, managed device 240, processing platform 250, and/or computing resource 255 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
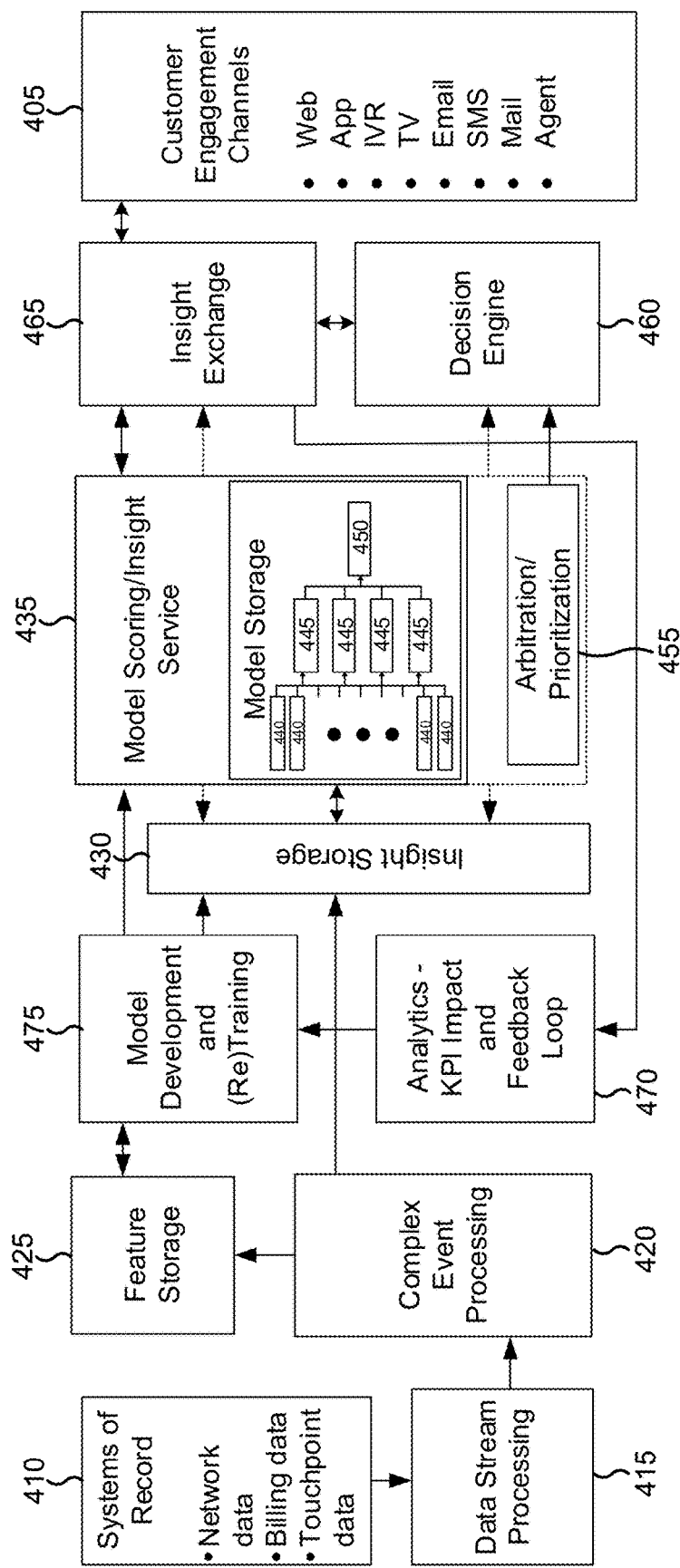
FIG. 4 is a diagram of example modules of a processing platform described herein.

FIG. 4 is a diagram of example modules of a processing platform described herein (e.g., the processing platform of FIG. 1, processing platform 250, and/or the like).

As shown by reference number 405, the processing platform can be associated with a set of customer engagement channels. The set of customer engagement channels can include one or more of the channels described elsewhere herein. A support device can facilitate a user interaction via one or more of the customer engagement channels.

As shown by reference number 410, the processing platform can be associated with a set of systems of record. Here, the set of systems of records are associated with network data, billing data, and touchpoint data, and/or the like. In some implementations, a system of record can store or maintain data associated with a managed device, such as information identifying states of the managed device. In some implementations, a system of record can be implemented as part of a managed device, or can handle data associated with many, different managed devices.

As shown by reference number 415, the processing platform can include a data stream processing module. The data stream processing module can handle communication with the set of systems of record. For example, the data stream processing module can perform input/output, physical-layer communication, and/or the like, to obtain data streams of supplemental information from the set of systems of record (e.g., in real time, in batches, etc.).

As shown by reference number 420, the processing platform can include a complex event processing module. The complex event processing module can provide real time and/or batch ingestion of data with multiple formats, such as information received or retrieved by the data stream processing module. In some implementations, the complex event processing module can identify an insight based on the data. For example, the complex event processing engine can use a rule, a model, an algorithm, and/or the like, to identify patterns in data (e.g., raw data) and determine an insight based on the data. In some implementations, the complex event processing engine can use event detection, aggregation, clustering, and/or patterning rules to identify an insight, which can be used to determine an action, a prediction, and/or the like.

As shown by reference number 425, the processing platform can include a feature storage module. The feature storage module can support the reuse of features across multiple, different models. Such features can include, for example, data that can be used by the multiple, different models, intermediate outputs or values that can be used by the multiple, different models, and/or the like. Thus, the models can be developed and/or operated more efficiently by reducing redundant processing. Furthermore, data associated with different domains (e.g., network, billing, ordering, etc.) can be shared between multiple, different models, thereby creating a more uniform data model for the plurality of models.

As shown by reference number 430, the processing platform can include an insight storage module. The insight storage module can store information identifying insights determined using the one or more models, the complex event processing module, and/or the like. For example, the insight storage module can store information identifying users and insights corresponding to the users. In some implementations, the insight storage module can facilitate high-volume and/or low-latency reads and/or writes for determination of actions, predictions, and/or additional insights based on the insights. Examples of the actions and/or predictions described herein can include next best actions (NBAs), next best offers (NBOs), next best clicks (NBCs), and/or the like.

As shown by reference number 435, the processing platform can include a model scoring and/or insight service (model scoring/insight service) module. The model scoring/insight service module can deploy and/or score models (e.g., in real time) to provide information identifying insights, actions, and/or predictions (e.g., to user devices, support devices, and/or the like). In some implementations, the model scoring/insight service module can aggregate batch insights (e.g., determined by batch models), real time insights (e.g., determined using models maintained by the model scoring/insight service module), and insights not determined using a model (e.g., insights determined by the complex event processing module, and/or the like).

As shown, the model scoring/insight service module can maintain (e.g., store, have access to) various models. Inputs to the models (e.g., information regarding user interactions, supplemental information, etc.) are shown by the blocks indicated by reference number 440. Examples of these inputs can include information identifying an outage condition, a broadband home router performance value, a set top box performance value, a wired Internet performance value, a network performance value, a WiFi performance value, information identifying a customer interaction, information identifying an event associated with a customer profile, and/or the like. The various models are illustrated by the blocks indicated by reference number 445. For example, the models can include a tech support intent prediction model, a billing/renewal intent prediction model, a payment intent prediction model, a sales/upgrade intent prediction model, and/or the like. An output based on the models is shown by reference number 450. For example, the output can be an insight, a prediction based on an insight, an action based on an insight, and/or the like.

In some implementations, the processing platform (e.g., the model scoring and/or insight service module) can fall back to a static rule-based insight. For example, the processing platform can determine that no insight determined using a model is associated with a confidence score that satisfies a threshold, and can therefore determine a prediction or action using an insight determined using a static rule (e.g., an insight determined by the complex event processing module or another module of the processing platform). Thus, the processing platform can determine an insight using a static rule when no model-based insight satisfies a threshold, thereby improving flexibility of the processing platform and reducing likelihood of an error case when no relevant model can be identified.

As shown by reference number 455, the processing platform can include an arbitration and/or prioritization (arbitration/prioritization) module. The arbitration/prioritization module can use one or more rules or methods to prioritize the output of models (e.g., insights, actions, predictions, etc.). In some implementations, the arbitration/prioritization module can determine which insight (e.g., action, prediction, etc.) is to be used when two or more insights conflict with each other. For example, the arbitration/prioritization module can perform these determinations based on an algorithm that uses a machine learning parameter (e.g., an XGBoost fundamental and/or the like) to facilitate selection between the various outputs. As another example, the arbitration/prioritization module can use a matrix (e.g., an optimization matrix) that refines and/or prioritizes particular outputs to determine a best prioritization of a set of outputs.

As shown by reference number 460, the processing platform can include a decision engine module. In some implementations, the decision engine module can determine which actions and/or predictions, of the actions and/or predictions determined using the models, are to be performed or provided for particular users. For example, the decision engine module can use business rules, targeting logic, filtering logic, suppression rules, and/or the like, to determine which actions and/or predictions are to be provided, are to be prioritized, are not to be provided, and/or the like. As a particular example, a suppression rule can indicate that a particular action is not to be performed with regard to a user interaction when the user interaction is associated with a particular channel.

As shown by reference number 465, the processing platform can include an insight exchange module. The insight exchange module can provide insights (e.g., model outputs) for use by other applications of the processing platform and/or third party applications. By using a single insight exchange module, complexity of point-to-point architecture of the processing platform can be reduced. Furthermore, reliability and variability in insights can be reduced by using the single insight exchange module. Still further, using a single insight exchange module can reduce cost and complexity associated with communication between the processing platform and third party applications.

As shown by reference number 470, the processing platform can include an analytics module. The analytics module can track feedback for a model based on a performance indicator (e.g., a key performance indicator and/or the like), such as a churn value, a call value, a revenue value, etc. Furthermore, the analytics module can use this feedback to facilitate updating of a model (e.g., by the model development and training or retraining module described below). For example, the analytics module can provide testing (e.g., AB testing and/or the like) of model-driven insights in comparison to insights based on a static rules-based approach, and can provide a feedback loop based on user acceptance or rejection of an action or prediction. In some implementations, the analytics module can build a test group for a particular model, action, or prediction. For example, the analytics module can configure the test group so that the particular model, action, or prediction is provided only to the test group in order to evaluate performance of the particular model. Thus, the analytics module can facilitate the development and deployment of models using test groups, thereby mitigating an impact of a training stage of a model on a broader population.

As shown by reference number 475, the processing platform can include a model development and training or retraining ((Re)training) module. The model development and training or retraining module can train and/or update (e.g., retrain) machine learning models, such as the models used to determine insights, predictions, and/or actions. In some implementations, the model development and training or retraining module can facilitate the reuse of code (e.g., routines, plugins, sub-models, etc.) between models, thereby conserving processing and development resources associated with the development of different models. The process of training and retraining (e.g., updating) models is described in more detail elsewhere herein.

In some implementations, one or more of the modules described in connection with FIG. 4 can be implemented on premises (e.g., on a customer premises). For example, one or more of a system of record module, a data stream processing module, a feature storage module, a complex event processing module, a model development and (re)training module, an analytics module, and/or the like, can be implemented using one or more devices (e.g., a processing platform, part of a processing platform, a server device, a user device, etc.) that are provided on-premises. This can conserve network bandwidth that would otherwise be used to provide large datasets to a cloud environment, and can enable the satisfactions of certain laws or regulations regarding data privacy, confidentiality, and so on. When such modules are implemented locally (e.g., on premises), a model can provide an insight or score to the model scoring and insight service module, which can determine a prediction or action based on the insight or score.

As indicated above, FIG. 4 is provided merely as an example. Other examples are possible and can differ from what was described with regard to FIG. 4.

FIG. 5 is a flow chart of an example process 500 for determining an action or a prediction based on information regarding a user interaction and supplemental information associated with the user interaction. In some implementations, one or more process blocks of FIG. 5 can be performed by a processing platform (e.g., processing platform 250). In some implementations, one or more process blocks of FIG. 5 can be performed by another device or a group of devices separate from or including the processing platform, such as a user device, a support device, a server device, or a managed device.

As shown in FIG. 5, process 500 can include receiving information regarding a user interaction (block 510). For example, the processing platform (e.g., using processor 320, input component 350, communication interface 370, storage component 340, and/or the like) can receive information regarding a user interaction, as described above. In some implementations, the user interaction is associated with one or more channels. In some implementations, the one or more channels correspond to respective interfaces or media for the user interaction.

As further shown in FIG. 5, process 500 can include retrieving supplemental information associated with the user interaction (block 520). For example, the processing platform (e.g., using processor 320, input component 350, output component 360, communication interface 370, storage component 340, and/or the like) can retrieve supplemental information associated with the user interaction, as described above. In some implementations, the supplemental information can relate to at least one of a state of a managed device associated with the user interaction or a previous user interaction.

As further shown in FIG. 5, process 500 can include identifying, based on the information regarding the user interaction or the one or more channels, one or more models to process the information regarding the user interaction and the supplemental information (block 530). For example, the processing platform (e.g., using processor 320, input component 350, communication interface 370, storage component 340, and/or the like) can identify one or more models to process the information regarding the user interaction and the supplemental information, as described above. In some implementations, the processing platform can identify the one or more models based on the information regarding the user interaction or the one or more channels. In some implementations, the one or more models can be identified from a plurality of models.

As further shown in FIG. 5, process 500 can include predicting a reason for the user interaction using the one or more models (block 540). For example, the processing platform (e.g., using processor 320, input component 350, communication interface 370, storage component 340, and/or the like) can predict a reason for the user interaction using the one or more models, as described above. In some implementations, the processing platform can predict the reason using an insight determined using the one or more models.

As further shown in FIG. 5, process 500 can include determining, using the one or more models, an action to be performed with regard to the user interaction (block 550). For example, the processing platform (e.g., using processor 320, input component 350, communication interface 370, storage component 340, and/or the like) can determine an action to be performed with regard to the user interaction, as described above. In some implementations, the processing platform can determine the action to be performed using the one or more models.

As further shown in FIG. 5, process 500 can include providing information identifying the action and/or the reason (block 560). For example, the processing platform (e.g., using processor 320, output component 360, communication interface 370, storage component 340, and/or the like) can provide information identifying the action and/or the reason, as described above. In some implementations, the processing platform can provide this information to a support device associated with the user interaction, a user device associated with the user interaction, and/or the like.

As further shown in FIG. 5, process 500 can include performing the action (block 570). For example, the processing platform (e.g., using processor 320, output component 360, communication interface 370, storage component 340, and/or the like) can perform the action, as described above. As further shown in FIG. 5, process 500 can include causing the action to be performed (block 580). For example, the processing platform, (e.g., using processor 320, output component 360, communication interface 370, storage component 340, and/or the like) can cause the action to be performed, as described above. In some implementations, the processing platform can cause a user device to perform the action. In some implementations, the processing platform can cause a managed device to perform the action. In some implementations, the processing platform can cause a support device to perform the action.

Process 500 can include additional implementations, such as any single implementation or any combination of implementations described below and/or in connection with one or more other processes described elsewhere herein.

In some implementations, the processing platform can determine a result of the action; and update the one or more models based on the result and using a machine learning technique. In some implementations, the processing platform can predict a reason for the user interaction using the one or more models or a rule, wherein the action is based on the predicted reason.

In some implementations, the action relates to the managed device associated with the user interaction, and the processing platform can automatically perform the action with regard to the managed device. In some implementations, the one or more models output information identifying an insight regarding the user interaction, wherein the action is determined based on the insight. In some implementations, the processing platform can determine the supplemental information based on a data stream, wherein the data stream indicates the state of the managed device associated with the user interaction or the previous user interaction.

In some implementations, a model, of the one or more models, is associated with an external device external to the platform. The processing platform can provide at least part of the information regarding the user interaction or the supplemental information to the external device. The processing platform can receive a result from the external device, wherein the action is determined based on the result.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, and/or a combination of hardware and software.

Some implementations are described herein in connection with thresholds. As used herein, satisfying a threshold can refer, depending on the context, to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods does not limit the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A platform, comprising:
one or more memories; and
one or more processors, communicatively coupled to the one or more memories, to:
  receive information regarding a user interaction,
    wherein the user interaction is associated with one or more channels,
      wherein the one or more channels correspond to respective interfaces or media for the user interaction;
  retrieve supplemental information associated with the user interaction,
    wherein the supplemental information relates to a state of a managed device associated with the user interaction;
  identify, based on the information regarding the user interaction or the one or more channels, one or more models to process the information regarding the user interaction and the supplemental information,
    wherein the one or more models are identified from a plurality of models;
  determine, using the one or more models and based on historical data associated with the user interaction, one or more insights associated with the user interaction;
  determine, based on prioritizing the one or more insights, an action to be performed with regard to the user interaction,
    wherein the one or more insights are prioritized based on a parameter that indicates how well each of the one or more insights correlate to the user interaction; and
  provide information identifying the action.

2. The platform of claim 1, wherein the one or more processors are further to:
  determine a result of the action; and
  update the one or more models based on the result and using a machine learning technique.

3. The platform of claim 1, where the one or more processors are further to:
  predict a reason for the user interaction using the one or more models or a rule,
    wherein the action is based on the reason.

4. The platform of claim 1, wherein the action relates to the managed device associated with the user interaction, and
  wherein the one or more processors are further to:
    automatically perform the action with regard to the managed device.

5. The platform of claim 1, wherein the one or more processors are further to:
  determine the supplemental information based on a data stream,
    wherein the data stream indicates the state of the managed device associated with the user interaction.

6. The platform of claim 1, wherein a model, of the one or more models, is associated with an external device external to the platform, and
  wherein the one or more processors are further to:
    provide at least part of the information regarding the user interaction or the supplemental information to the external device; and
    receive a result from the external device,
      wherein the action is determined based on the result.

7. A non-transitory computer-readable medium storing instructions, the instructions comprising:
  one or more instructions that, when executed by one or more processors, cause the one or more processors to:
    receive information regarding a user interaction,
      wherein the user interaction is associated with one or more channels,
        wherein the one or more channels correspond to respective interfaces or media for the user interaction;
    retrieve supplemental information associated with the user interaction,
      wherein the supplemental information relates to a state of a managed device associated with the user interaction;
    identify, based on the information regarding the user interaction, one or more models to process the information regarding the user interaction and the supplemental information,
      wherein the one or more models are identified from a plurality of models;
    determine, using the one or more models and based on historical data associated with the user interaction, one or more insights associated with the user interaction;
    determine, based on prioritizing the one or more insights, an action to be performed with regard to the user interaction,
      wherein the one or more insights are prioritized based on a parameter that indicates how well each of the one or more insights correlate to the user interaction; and
    provide information identifying the action.

8. The non-transitory computer-readable medium of claim 7, wherein the one or more instructions, when executed by the one or more processors, further cause the one or more processors to:
  determine a result of the action; and
  update the one or more models based on the result and using a machine learning technique.

9. The non-transitory computer-readable medium of claim 7, wherein the one or more instructions, when executed by the one or more processors, further cause the one or more processors to:

predict a reason for the user interaction using the one or more models or a rule,
   wherein the action is based on the reason.
10. The non-transitory computer-readable medium of claim 7, wherein the action relates to the managed device associated with the user interaction, and wherein the one or more instructions, when executed by the one or more processors, further cause the one or more processors to:
   automatically perform the action with regard to the managed device.
11. The non-transitory computer-readable medium of claim 7, wherein the one or more instructions, when executed by the one or more processors, further cause the one or more processors to:
   determine the supplemental information based on a data stream,
      wherein the data stream indicates the state of the managed device associated with the user interaction.
12. The non-transitory computer-readable medium of claim 7, wherein a model, of the one or more models, is associated with an external device, and wherein the one or more instructions, when executed by the one or more processors, further cause the one or more processors to:
   provide at least part of the information regarding the user interaction or the supplemental information to the external device; and
   receive a result from the external device, wherein the action is determined based on the result.
13. A method, comprising:
   receiving, by a platform, information regarding a user interaction, wherein the user interaction is associated with one or more channels,
      wherein the one or more channels correspond to respective interfaces or media for the user interaction;
   retrieving, by the platform, supplemental information associated with the user interaction,
      wherein the supplemental information relates to a state of a managed device associated with the user interaction;
   identifying, by the platform and based on the information regarding the user interaction, one or more models to process the information regarding the user interaction and the supplemental information,
      wherein the one or more models are identified from a plurality of models;
   determining, by the platform, using the one or more models, and based on historical data associated with the user interaction, one or more insights associated with the user interaction;
   determining, by the platform and based on prioritizing the one or more insights, an action to be performed with regard to the user interaction,
      wherein the one or more insights are prioritized based on a parameter that indicates how well each of the one or more insights correlate to the user interaction; and
   providing, by the platform, information identifying the action.
14. The method of claim 13, further comprising:
   determining a result of the action; and
   updating the one or more models based on the result and using a machine learning technique.
15. The method of claim 13, further comprising:
   predicting a reason for the user interaction using the one or more models or a rule,
      wherein the action is based on the reason.
16. The method of claim 13, wherein the action relates to the managed device associated with the user interaction, and wherein the method further comprises:
   automatically performing the action with regard to the managed device.
17. The method of claim 13, further comprising:
   determining the supplemental information based on a data stream,
      wherein the data stream indicates the state of the managed device associated with the user interaction.
18. The platform of claim 1, wherein the one or more processors are further to:
   determine, based on determining that none of the one or more insights are associated with a confidence score that satisfies a threshold, another insight using a static rule; and
   determine, based on the other insight, an action to be performed with regard to the user interaction.
19. The non-transitory computer-readable medium of claim 7, wherein the one or more instructions, when executed by the one or more processors, further cause the one or more processors to:
   determine, based on determining that none of the one or more insights are associated with a confidence score that satisfies a threshold, another insight using a static rule; and
   determine, based on the other insight, an action to be performed with regard to the user interaction.
20. The method of claim 13, further comprising:
   determining, based on determining that none of the one or more insights are associated with a confidence score that satisfies a threshold, another insight using a static rule; and
   determining, based on the other insight, an action to be performed with regard to the user interaction.

* * * * *